Sept. 20, 1966  J. CLEGG  3,274,319

MANUFACTURE OF RIBBED POROUS PLASTIC SHEETING

Filed Nov. 5, 1963

INVENTOR
JOSEPH CLEGG

BY Watson, Cole, Grindle & Watson

ATTORNEYS

United States Patent Office
3,274,319
Patented Sept. 20, 1966

3,274,319
MANUFACTURE OF RIBBED POROUS PLASTIC SHEETING
Joseph Clegg, Dagenham, Essex, England, assignor to Pritchett & Gold and E.P.S. Company Limited, Essex, England, a company of Great Britain
Filed Nov. 5, 1963, Ser. No. 321,505
Claims priority, application Great Britain, Nov. 7, 1962, 42,046/62
8 Claims. (Cl. 264—126)

This invention relates to the production of plastic strip from powder, and is particularly, though not exclusively, concerned with the production of a porous or microporous strip or sheet material by sintering a plastic powder. In particular the invention may be applied to the production of a strip having ribs or grooves on its surface.

Sintered sheets of polymer powders are conveniently produced by delivering a continuous layer of the powder on to a travelling belt for subsequent sintering by heat treatment, the belt passing below a fixed die which controls the thickness of the layer. Sintered plastic sheeting produced in this way has good permeability for such purposes as gas and liquid filtration. Thus it can be employed as a diaphragm or separator for use in electric storage batteries. When impregnated with oil such sheeting can be used as a carrier for lubricants in mechanical devices to reduce friction between moving parts.

According to one aspect of the present invention the apparatus used in the production of plastic strip from a powder, in which a layer of the powder is carried on a travelling support under a stationary die which engages the powder to form the surface of the emerging layer, is characterised by means for discharging air into the layer of powder approaching the die to cause it to be in a state of fluid motion as it reaches the die.

The term air (as used herein) is intended to include any suitable gaseous medium, although normally air would be convenient and economical.

Another aspect of the invention is concerned with the corresponding method of producing the plastic strip.

For many such purposes it is required or convenient that the upper surface of the sintered strip shall have ribs or grooves. This can be achieved by shaping the operative lower surface of the fixed die whereby it will impart the desired profiled form to the surface of the powder layer. For example, in the production of battery separators the desired profile may include a series of ribs projecting above the main body of the separator, and the operative lower surface of the die may be slotted to correspond to the desired shape and spacing of the ribs.

It is found that the use of a fixed profiling die is preferable to a rotating or other moving die because it has less tendency to consolidate the powder and so impair the porosity of the final sintered product. Vibration should also be avoided because of a like tendency to cause consolidation. However the effect of drag between the powder and the die can result in the rib or like formation being rough and uneven, particularly if polymer powders having poor flow properties are used. Furthermore, in the case of a battery separator, it is desirable that the ribs shall be narrow, particularly at their junction with the body of the separator, in order to preserve a high electrical performance. The production of relatively tall and narrow ribs which are also smoothly and evenly formed can be particularly difficult.

The present invention provides an effective means of overcoming or reducing the effects of drag between the surfaces of the die and the polymer powder, without resulting in compaction of the powder.

Conveniently the air is discharged into the layer of powder from outlets immersed in the layer. Thus the air may be supplied to a tube extending across the width of the layer and having outlets formed in it. At least a part of the wall of the tube may be formed of porous or microporous material, the pores forming the air outlets, which may if desired be graded to cause the majority of the air to issue from the upper part of the tube. Preferably the tube is of non-circular section, its height being less than its width.

The invention may be put into practice in various ways but one specific embodiment will be described by way of example with reference to the accompanying drawings, in which.

Figure 1:
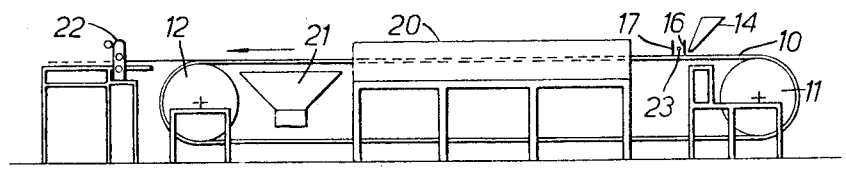
FIGURE 1 is a diagrammatic elevation of an apparatus for producing ribbed microporous plastic strip for electric storage battery separators.
Figure 2:
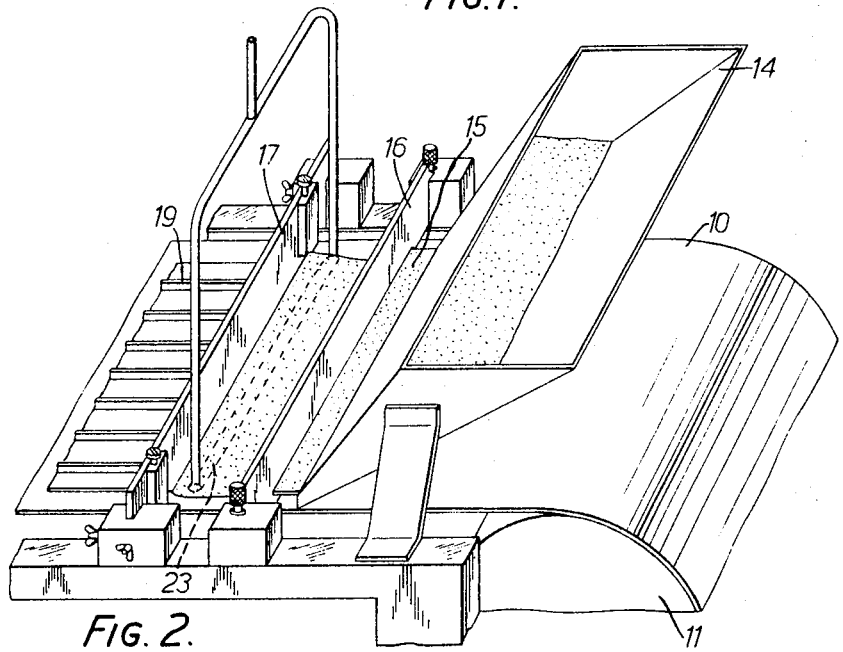
FIGURE 2 is an enlarged perspective view of the hopper and die.
Figure 3:
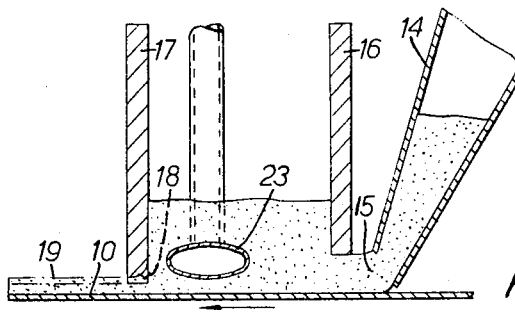
FIGURE 3 is an enlarged detail section of the die and aerating means.
Figure 4:
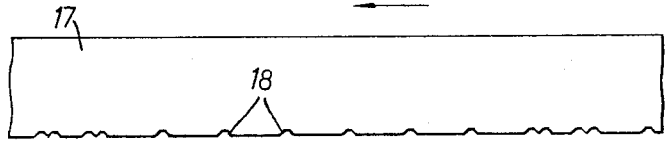
FIGURE 4 is a view of one form of die.

As shown in FIGURE 1 a conveyor for the thermoplastic polymer powder, for example polyvinyl chloride powder or high density polyethylene powder of particle size up to 150 microns, comprises a stainless steel belt 10 passing around two pulleys 11, 12, with the upper run of the belt supported by lateral bars (not shown) over which the belt slides. At one end of the conveyor a supply hopper 14 for the powder is supported above the belt to discharge a layer or "blanket" of powder 15 across the full width of the belt. Beyond the hopper an adjustable gate 16, extending across the belt, controls the issue of powder from the hopper and ensures that the blanket of powder is of substantially even thickness. Beyond the gate 16, a fixed die 17 having its lower edge formed with slots 18 is provided for imparting the desired ribbed form 19 to the powder layer.

The belt, with the ribbed layer of powder on it, then travels through a sintering oven 20 from which the sintered material emerges and is cooled by air issuing from a duct 21 prior to being stripped from the belt. The sintered material is then fed to a cutting machine 22 wherein fixed knives cut the material into strips of the required width and a guillotine then cuts the resulting strips into pieces of the required length.

Care is taken to ensure that no vibration is transmitted to the belt during the powder laying, rib forming and sintering operations. This fact, coupled with the absence of any pressure on the powder, and the choice of particle size, ensures a high level of microporosity in the final sintered material.

In accordance with the present invention, means are provided for aerating the powder layer as it approaches the profiling die. The said means conveniently comprise a tube 23 of microporous material extending across the full width of the layer on the belt, and located on the upstream side of the die at a height above the belt such that in operation the tube will be completely immersed in the powder. The tube is of elliptical section with a major axis about ½ inch and a minor axis about ¼ inch, the major axis being horizontal, and is spaced approximately ⅛ inch from the adjacent face of the die, with its lower face approximately level with the tops of the slots in the die. The microporous material of the tube comprises a sintered high density polyethylene having a volume porosity of approximately 40% and an average pore size of 50 microns. Such a tube may for example be manufactured in accordance with British Patent No. 829,305.

By connecting both ends of the microporous tube to a supply of low pressure air, a discharge of air is provided which is distributed substantially uniformly over the full width of the powder layer. In the present embodiment the lower half of the microporous tube has reduced porosity in order to increase the flow of air from the upper half.

In operation the blanket of powder travels along on the belt from the gate towards the profiling die and the discharge of low pressure air from the whole surface of the tube directly into the body of the powder causes the powder to become aerated, so that the blanket, throughout its whole depth, is in a state of fluid motion. This considerably reduces the drag effect which would otherwise occur between the sides of the slots and the powder as it passes through the die, but it does not disturb the profiled layer which emerges from the die. Thus the aerating effect is wholly confined to the area between the gate and the die, ceasing as the profiled layer of powder leaves the die. The tube itself offers negligible impedance to the travel of the powder because of its shape and orientation and the fact that the air emerging from its pores facilitates the flow of the powder above and below the tube. As mentioned previously the absence of any vibration also ensures that the accuracy and sharpness of the profile of the ribs, as produced by the slotted die, is not subsequently affected as the powder travels on to the sintering oven.

It has been found that a flow of air to a microporous tube of the type described above at a rate of 8 cubic feet per hour and at a pressure of 0.5 inch water gauge, is sufficient to impart such good flow properties to the powder that a perfect rib formation is obtained. The belt speed may be between two and nine feet per minute. The improvements provided by the present invention are particularly marked when very fine polymer powders are used, for example those having an average particle size of 35 microns. Similarly the present invention is particularly beneficial when diluents or additives such as wood flour are added to the polymer powder in accordance with well known practices in the battery separator art. Such fine powders and powder mixtures have very poor flow properties due to interlocking and packing or consolidation of the particles thereof, and in the absence of the aeration means of the present invention it is particularly difficult to obtain smooth and accurately formed ribs.

What I claim as my invention and desire to secure by Letters Patent is:

1. A method of producing plastic strip from a powder, which includes a layer of the powder on a travelling support under a stationary die which engages the powder to form the surface of the emerging layer, discharging air into the layer of powder approaching the die to render it fluid as it reaches the die and subsequently subjecting the layer to heat treatment to form the strip.

2. A method as claimed in claim 1 in which the die is profiled to form the upper surfaces of the strip with ribs.

3. A method as claimed in claim 1 in which the heat treatment to form the strip comprises sintering.

4. A method as claimed in claim 1 in which the air is discharged into the layer of powder from outlets immersed in the layer.

5. A method as claimed in claim 4 in which the air is supplied to a tube extending across the width of the layer and having outlets formed in it.

6. A method as claimed in claim 5 in which at least a part of the wall of the tube is porous and the pores form the air outlets.

7. A method as claimed in claim 5 in which the outlets are graded to cause the majority of the air to issue from the upper part of the tube.

8. A method as claimed in claim 5 in which the tube is of non-circular section and its height is less than its width.

References Cited by the Examiner
UNITED STATES PATENTS

| | | | |
|---|---|---|---|
| 2,834,045 | 5/1958 | Davies | 264—50 |
| 3,067,469 | 12/1962 | Yarrison | 264—126 |

ROBERT F. WHITE, *Primary Examiner.*

J. R. HALL, *Assistant Examiner.*